June 12, 1962 W. BREY 3,038,526
TIRE BUILDING DRUM
Filed June 5, 1958 4 Sheets-Sheet 1

INVENTOR.
WILHELM BREY
BY
W. A. Fraser
ATTY.

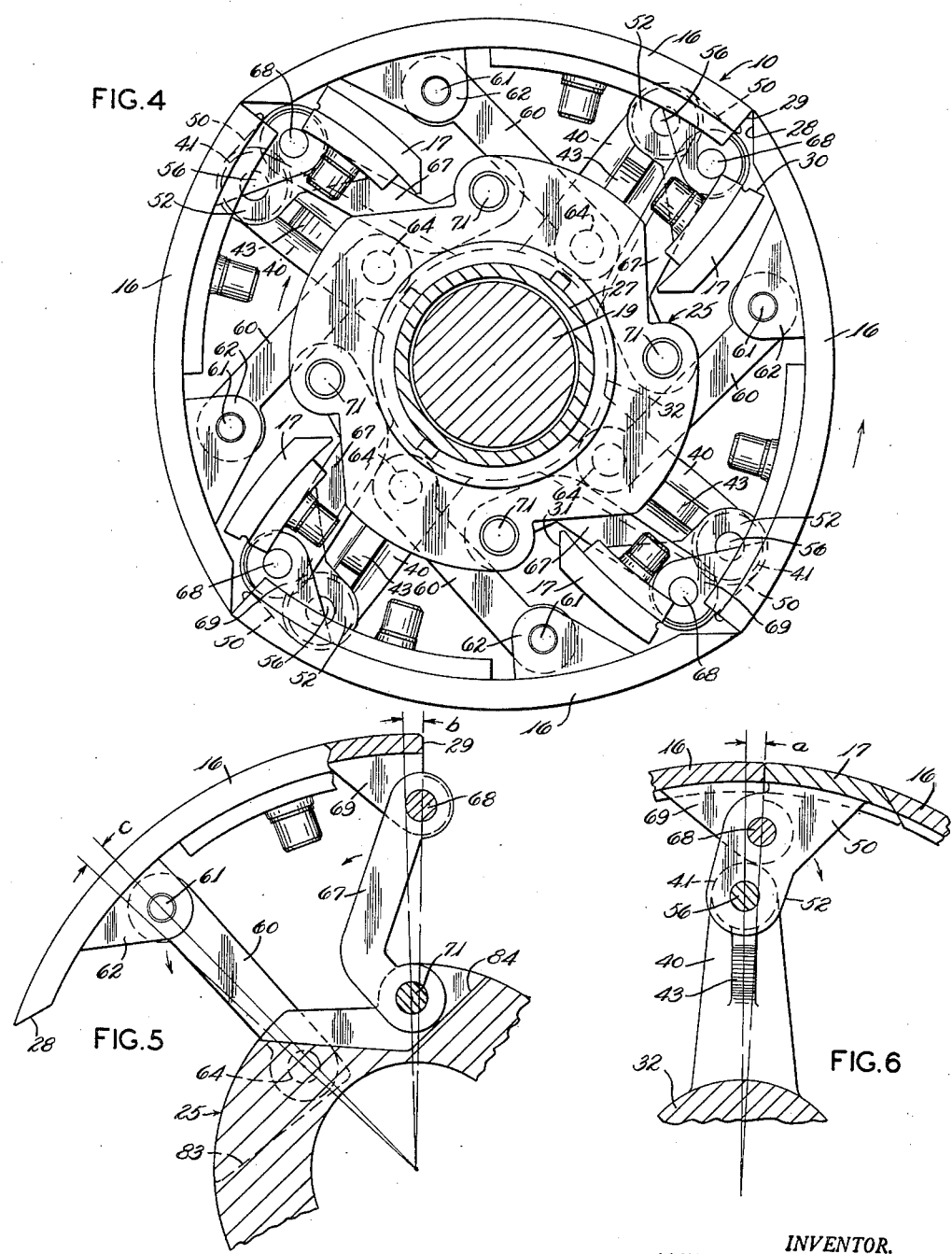

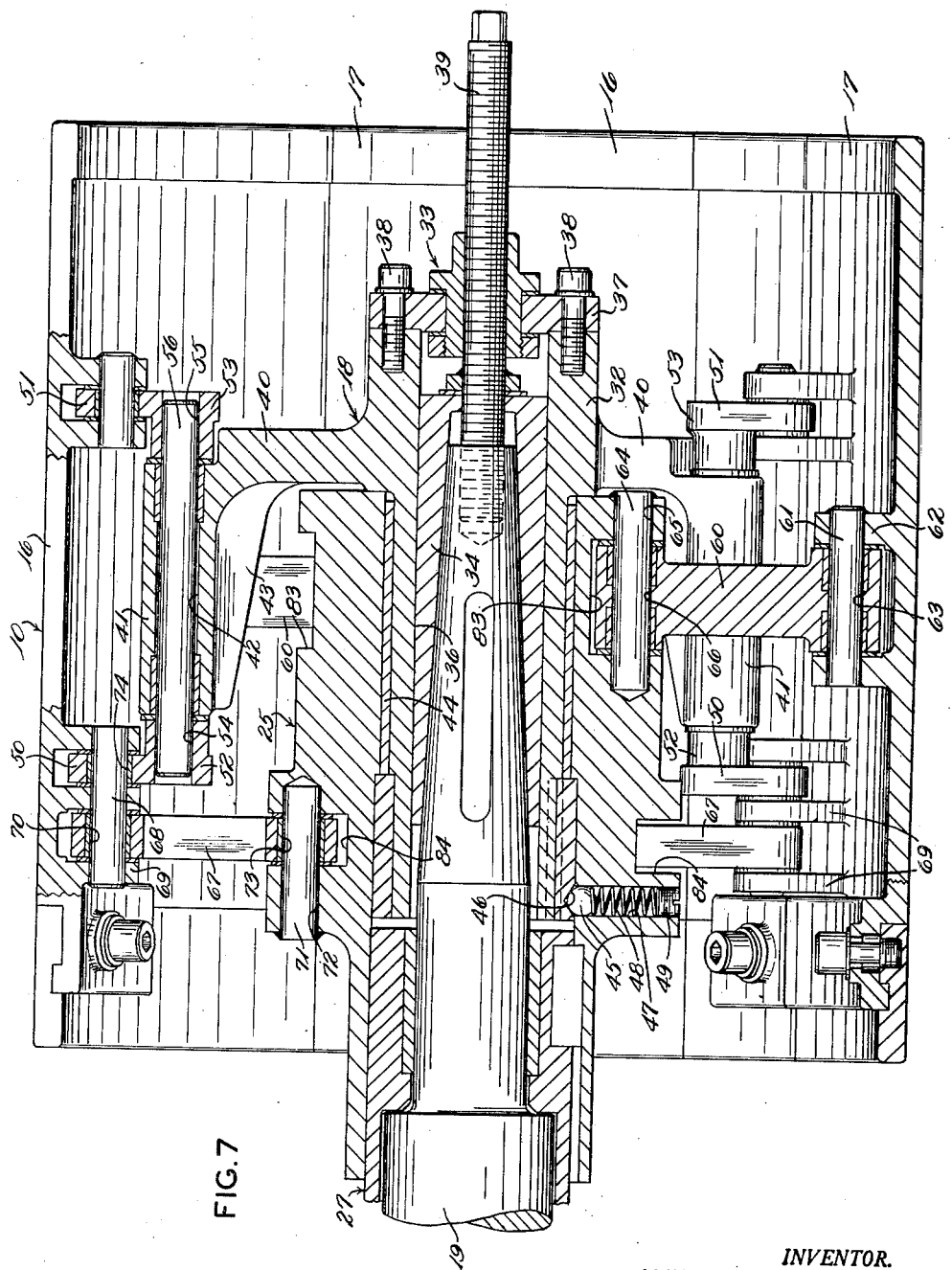

United States Patent Office 3,038,526
Patented June 12, 1962

3,038,526
TIRE BUILDING DRUM
Wilhelm Brey, Cuyahoga Falls, Ohio, assignor to The Firestone Tire & Rubber Company, Akron, Ohio, a corporation of Ohio
Filed June 5, 1958, Ser. No. 740,075
4 Claims. (Cl. 156—420)

This invention relates to tire building drums and more particularly to tire building drums of the collapsible type.

The trend in passenger tires has consistently been toward tires of smaller bead diameters. Thirty years ago, tires had bead diameters of 30 inches. The diameters then decreased in successive steps of about one or two inches until immediately after World War II, most passenger tires had bead diameters of 16 inches. They have now been reduced successively to 15 inches and 14 inches and diameters of 13 inches and even 12 inches are now contemplated.

As the bead diameters of passenger tires have decreased in size, there has been an increasing need for better collapsible tire building drums. In order to remove a tire from a building drum, the drum must be collapsed so that it will have an average reduction in diameter of about 1½ to 2½ inches. This reduction in diameter can be obtained without undue difficulty in a drum for an 18-inch tire, for example; but producing such a reduction in drum diameter for 13-inch or 14-inch tires poses a more difficult problem, for in the smaller drum sizes, it is increasingly difficult to find interior radial space in which to store the segments of the collapsed drum.

The present invention is especially designed to meet this problem by providing a drum construction which has a maximum reduction in drum diameter from the expanded to the collapsed positions. At the same time, the collapse is accomplished in such a manner as to enable the collapsed drum to present a relatively smooth outer surface. In the preferred form of the invention, the surface of the drum is formed by eight segmental portions, comprising four relatively large segments alternating with four smaller segments. The large and small segments are connected to the hub of the drum by linkage mechanisms which operate in such a manner that, when the drum is collapsed, the small segments are retracted radially to positions immediately adjacent the hub while the large segments are brought together with their edges in close abutment. Thus in fully retracted position the large drum segments define an approximately rounded prismodial surface with the small drum segments completely enclosed therein. As a result, the effective diameter of the drum can be reduced to the maximum extent enabling a tire to be easily stripped from the drum. Moreover, the manner in which the large segments abut each other in the collapsed position eliminates the presence of projecting, unguarded sharp points and edges such as are present in the prior art drums.

The substantially closed surface which is formed when the drum is completely collapsed thus minimizes the danger of personal injury to the operator and minimizes the possibility of damaging the tire when it is removed from the drum.

It is accordingly a general object of the invention to provide an improved tire building drum. A further object is to provide a tire building drum which can be collapsed to the maximum possible extent enabling the tire to be readily removed therefrom. Another object is to provide a tire building drum which in its collapsed condition presents a relatively smooth unbroken surface without projecting sharp points or edges. A further object is to provide a tire building drum which is simple in design, which is strong and rugged in construction, which has a long service life and which requires low maintenance.

These and other objects and advantages will be more fully apparent from the following description of a preferred form of invention, reference being had to the accompanying drawings in which:

FIGURE 4 is a view similar to FIGURE 2 showing the drum in fully collapsed position;

FIGURE 5 is a somewhat diagrammatic, fragmentary view showing the swing arms for one of the large segments which make up the shell of the building drum and the manner in which it is connected to the drum;

FIGURE 6 is a view similar to FIGURE 5 showing the linkage for supporting and moving one of the small segments which make up the shell of the building drum; and FIGURE 7 is a longitudinal sectional view of the building drum, the section being taken in the plane indicated by the lines 8—8 in FIGURE 2.

Figure 1:
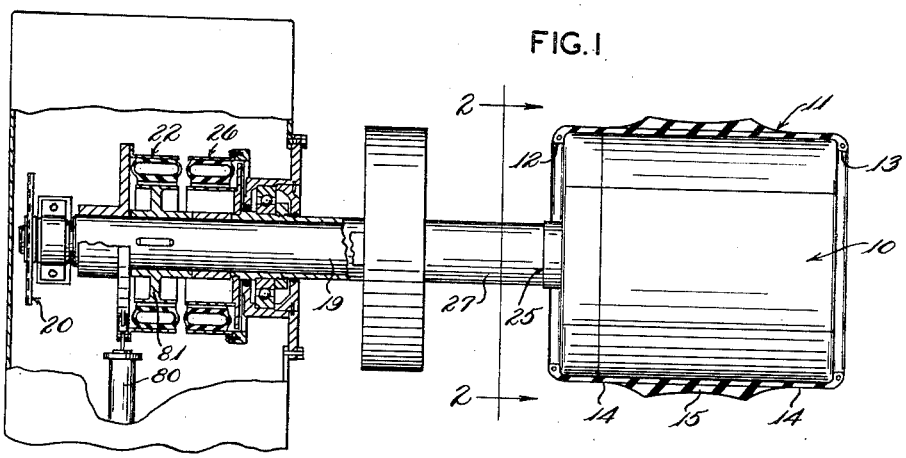
FIGURE 1 is a side elevation, partly in section, of a tire building drum embodying the present invention, the drum being shown with its parts in fully expanded position and with a tire assembled thereon.

Now referring first to FIGURE 1 of the drawings, a tire building drum, indicated generally at 10, embodying the present invention, is shown as comprising a cylindrical form providing support for the assembly of the various components which form a conventional passenger tire 11. Such a tire generally comprises a plurality of fabric plies which are assembled on the drum to form the tire body. The ends of the plies are turned radially in and over the shoulders of the drum and are wrapped about and anchored to inextensible cores to form the beads 12 and 13 of the tire. Sidewalls 14 and a tread portion 15 complete the tire.

After the tire 11 is completely assembled, the drum 10 must be collapsed to a smaller diameter to enable the inner bead 12 to be slipped over the collapsed drum and the tire to be stripped from the drum for the subsequent vulcanizing operation. In the present example, the drum is intended to be used in the manufacture of 8.10—14 size tires, the diameter of the drum in its expanded position being approximately 15¼ inches while the inside diameter of the beads is somewhat less than 14 inches, being about 13 to 13½ inches. As a result, the drum of FIGURE 1 must have a maximum diameter of approximately 12¾ inches in its collapsed position to enable the bead 12 to be slipped over the drum and the tire 11 to be removed therefrom.

The drum 10 comprises an outer shell formed by eight segmental portions consisting of four large segments 16 alternating respectively with four smaller segments 17. Each of the large segments 16 extends over approximately 70° of arc while each of the small segments extends over approximately 20° of arc. In the expanded condition of the drum, the eight segments fit tightly together and provide a substantially unbroken cylindrical drum surface. These segments and the linkage mechanism which connects them to the building drum will be described in detail later.

The drum has a hub 18 mounted on a cantilever shaft 19, see FIGURES 1 and 7, which is supported and driven by a suitable drive means, indicated generally at 20, the details of which form no part of this invention. A brake 22 is provided to stop the rotation of shaft 19. As part of the linkage mechanism just referred to, there is provided an actuating member 25 which is mounted on and which is normally driven by the hub 18 but which, when necessary, can be independently braked as by a brake 26 which acts upon the tubular extension 27 of the member 25. The brakes 22 and 26 may be of any conventional design and construction.

Figure 2:
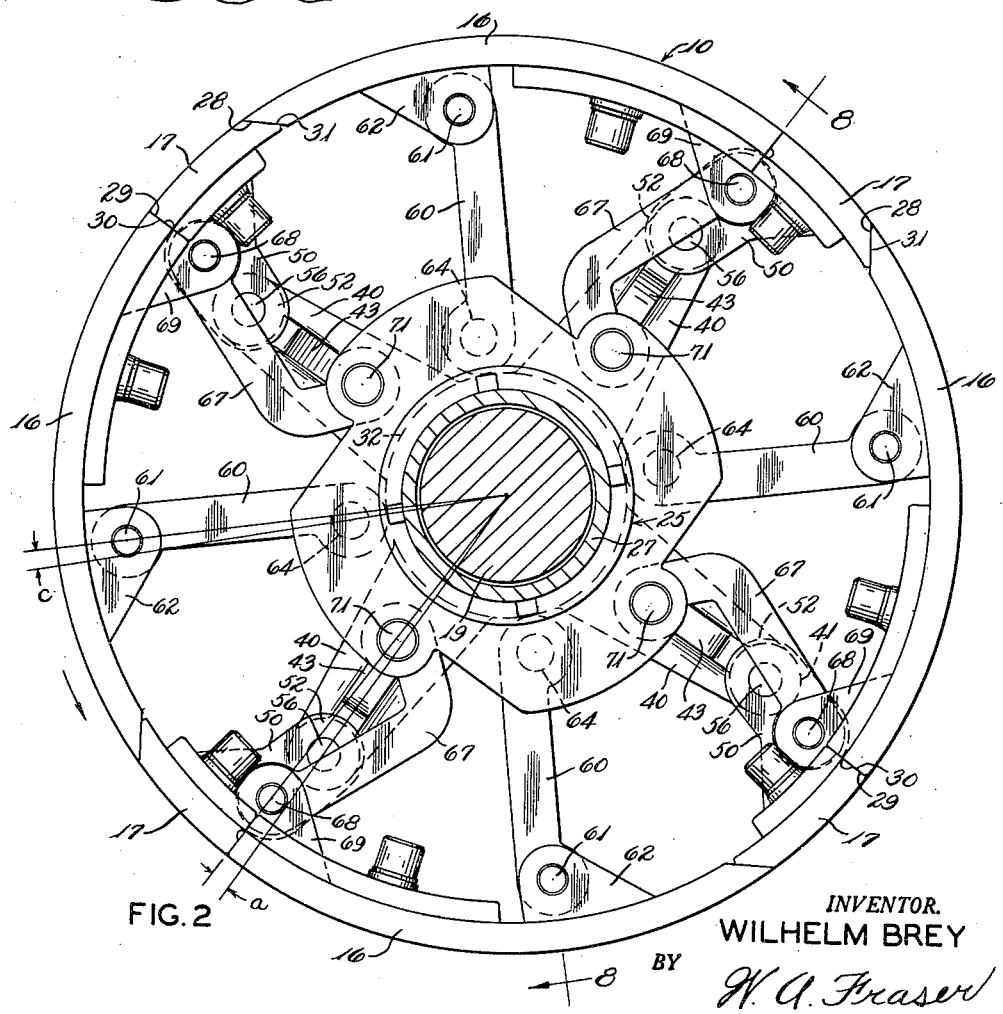
FIGURE 2 is a sectional view of the building drum of FIGURE 1, the section being taken in the radial plane indicated by the lines 2—2 in FIGURE 1 and being on an enlarged scale to show the details of the construction, the tire not being shown in this view.
Figure 3:
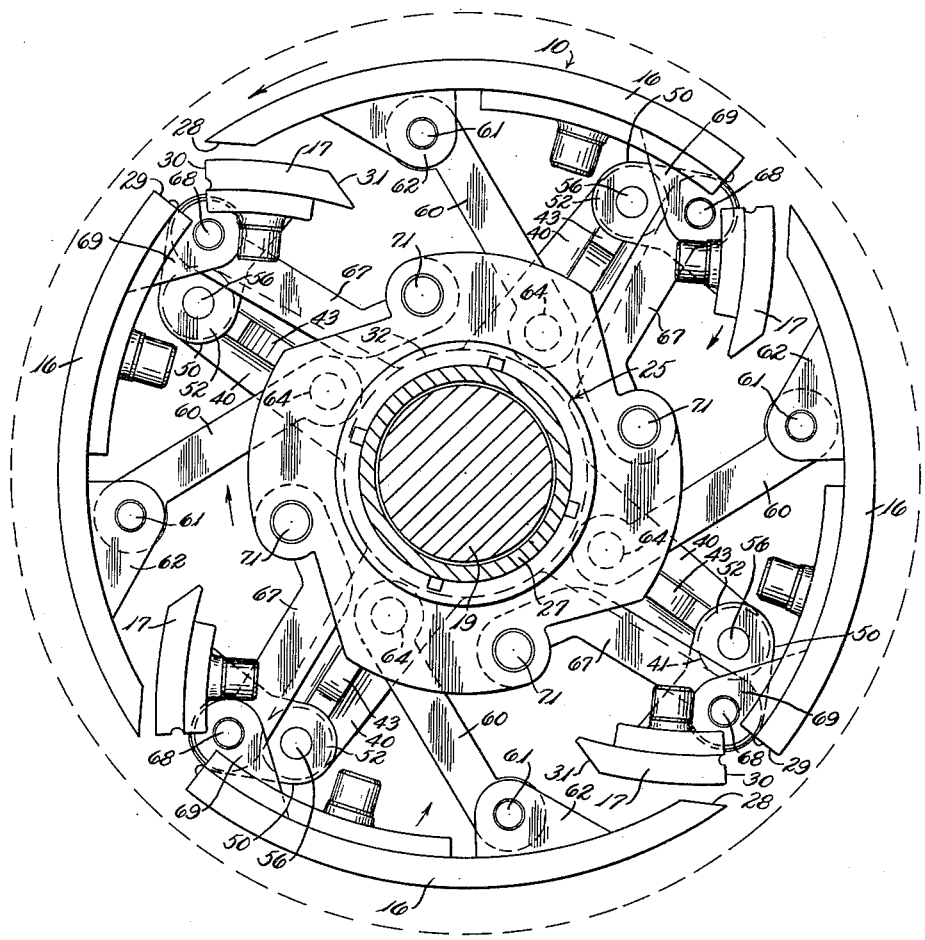
FIGURE 3 is a view similar to FIGURE 2 showing the drum with its parts in a position of partial collapse.

It should be understood that the drum 10 may be rotated in either direction but that it is intended to rotate counterclockwise during the tire building operation as indicated by the arrows in FIGURES 2–4. Accordingly, the chamfered edges 28 of the large segments 16 will be referred to as the leading or forward edges while the blunt edges 29 will be referred to as the trailing edges. Likewise, the edges 30 of the small segments will be referred to as the leading or forward edges and the chamfered edges 31 will be referred to as the trailing edges.

Before discussing the specific mechanisms by which the drum segments are supported and operated, the hub 18 and the actuating member 25 will be described since these two parts provide the ultimate support for the segments 16 and 17 and produce the required mechanical actions which result in the collapse and expanding movements of the drum. These parts are best shown in FIGURE 7.

The hub 18 comprises a body portion 32 which is secured to the drive shaft 19 by the arrangement indicated generally at 33 in FIGURE 7. The arrangement is conventional and will not be described in detail for it forms no part of the present invention. Essentially, it comprises a tapered sleeve 34 which is forced in a wedging action between the tapered end of the shaft 19 and the bore 36 of the hub. A ring member 37 which is secured to the end of the hub as by bolts 38 holds the hub onto the threaded extension 39 of the drive shaft. The arrangement permits the drum to be adjusted longitudinally on the shaft and enables it to be readily mounted on and removed from the shaft. Four radial arms or spokes 40 extend out from the body of the hub terminating at their outer ends in axially extending tubular portions 41 of substantial length. The portions 41 each have a longitudinal bore 42 and they are supported by underlying stiffening ribs 43 which are braced against the supporting spokes 40.

The actuating member 25 comprises a thick-walled sleeve having an internal bearing 44 which is journalled on the hub 18 just inboard of the radial spokes 40, see FIGURE 7. During normal operation of the drum, the actuating member rotates with the hub, being releasably engaged with the hub for four equally spaced ball detents 45 which fit within radial bores 47 in the wall of the actuating member and which project inwardly to seat in conical depressions 46 in the outer bearing surface of the hub. The balls are urged inwardly into the depressions by coil springs 48 which are compressed between the balls and threaded screws 49 which can be adjusted to control the force exerted by the springs. The ball detents provide a sufficient interlock between the actuating member 25 and the hub 18 so that for all normal operations of the drum, the two will rotate together. There is litter or no tendency during normal operation of the drum in the tire-building operation to exert enough torque upon the drum segments to overcome the ball detents, and, as will be explained later, the linkages which supports the outer drum segments are designed to resist accidental or inadvertent collapse of the drum. The ball detents, however, can be disengaged by braking the actuating member and positively driving the hub thereby permitting the actuating member to rotate on the hub to effect the collapsing and expanding movements of the drum. It is possible, too, to brake the actuating member while the hub and segments are rotating and utilize the rotational inertia of the parts to disengage the ball detents and operate the drum.

The drum segments 16 and 17 are connected to the hub 18 and to the actuating members 25 by linkages which are identical for like segments, and which link each large segment to its adjacent, trailing small segment so that the two will operate in conjunction with each other. Thus each small segment 17 has a pair of longitudinally spaced extensions 50 and 51 which project radially inwardly to terminate in enlarged end portions 52 and 53, respectively. These end portions have axially aligned bores 54 and 55 and the axial spacing of the end portions 50 and 51 is such as to enable them to straddle the axial portions 41 of the spokes 40 and to bring their bores into alignment with the bores 42. Longitudinally extending pivot pins 56 extending through the aligned bores of the axial portion and the ends 52 and 53 of the segment extensions hinge the small segments to the hub. As will be apparent later, the radial inward movement of the small segments takes place by swinging inwardly around the pivot pins 56, but this swinging movement can take place only in conjunction with and it is produced by a corresponding movement of the adjacent large segment.

Each large segment 16 is connected adjacent its forward edge to the actuating member 25 by a straight arm 60 which is pivoted at its outer end to the segment by a pin 61 which extends through a boss 62 cast integrally into the large segment and through a bore 63 in the outer end of the arm. The straight arm 60 is pivoted at its inner end to the actuating member 25 by a pin 64 passing into a hole 65 drilled axially in the actuating member and through a bore 66 in the radially inner end of the straight arm, see FIGURES 2 and 7. The trailing end portion of each large segment 16 is connected to the actuating member by a curved arm 67 which is pivoted at its outer end to the segment by a pin 68, which passes through a boss 69 cast integrally in the large segment and through a bore 70 in the outer end of the curved arm. The curved arm 67 is pivoted at its inner end to the actuating member by a pin 71 which passes into a hole 72 drilled axially into the actuating member 25 and through a bore 73 in the inner end of the curved arm, see FIGURES 3 and 7.

As mentioned above, the large segments 16 are operatively connected to the small segments 17 so that each large segment, when it moves radially in during the collapsing movement of the drum, also forces the adjacent, trailing, small segment radially inwardly ahead of the large segment. This is accomplished by extending each of the pins 68 axially so that it will extend through a bore 74 drilled in the extension 50 of the adjacent small segment 17, see FIGURE 7. Thus the movement of the large segments 16 will be transmitted by the pins 68 to the small segments. Preferably the bores 74 in the segments 17 are drilled about midway between the pin 56 and the outer surface of segment 17 as best shown in FIGURE 3.

As mentioned above, the drum is collapsed by producing relative rotation between the hub 18 and the actuating member 25. This is accomplished by applying the brake 26 to hold the actuating member stationary while the drum is rotating in the direction indicated by the arrows in FIGURES 2 and 3. The shaft 19 will not be positively driven at this moment but it should be rotating at such speed that the shaft, the hub, the segments and their connecting linkages will possess sufficient rotational energy to disengage the ball detents and rotate with respect to the actuating member 25 to effect complete collapse of the drum. Normal drum speeds will be sufficient to accomplish this.

As this relative rotation takes place, each large segment 16 will swing forward and radially inwardly on the arms 60 and 67 about the pins 64 and 71, respectively, as pivot points. As this inward movement of the large segments takes place, the pins 68 move inwardly and cause the adjacent small segments 17 to swing radially inwardly by pivoting about the pins 56. The arrangement is such that the small segments 17 have a radial component of motion appreciably greater than do the leading edges of the large segments with the result that the small segments will swing rapidly into the drum, clearing the way for the large segments to move inwardly toward each other. At the end of the collapsing movement, the small segments will have taken the position indicated in the FIGURE 4 and the large segments will have moved together until the leading edge of one segment closely adjoins the trailing edge of the preceding segment, the large segments thus forming a substantially closed surface without the presence of exposed or projecting sharp edges.

It will be noted, by comparing FIGURES 2 and 4, that the collapsing movement takes place as a result of the arms 60 and 67 moving from approximately radial positions, as indicated in FIGURE 2, to positions of substantial angularity as indicated in FIGURE 4. It will be observed, from FIGURE 4, that the arms 67 are curved in the manner shown to provide room for the small segments to fit entirely within the drum.

There are a number of features of construction which facilitate the collapsing movement. First, it will be noted that the effective length of the straight arms 60 is appreciably longer than the length of the curved arms 67 with the result that the trailing edges of the large segments tend to move in at a faster rate than the leading edges and this faster rate tends to insure that the small segments will be pulled bodily out of the way of the leading edges of the adjacent large segments. Furthermore, while the pins 68 move inwardly at a rate determined by the length of arms 67, such rate of movement is transmitted to the small segments through a lever advantage determined by the distance between pins 68 and 56 and the distance between the outer surface of the small segments and the pin 56. This mechanical advantage, so far as rate of movement is concerned, is about two-to-one; that is, the inward radial movement of the outer surface of a small segment 17 will be twice as fast as the inward movement of pin 68.

Another feature of construction which enables the small segments to move out of the way of the leading edges of the adjacent large segments is the manner in which the pins 68 are circumferentially offset from the pivot pins 56, as indicated at "a" in FIGURES 2 and 6 with the result that, as the collapse of the drum takes place, the movement of the pins 68 will be translated rapidly into a motion having an appreciable component of motion in the radial direction. This is to be contrasted with the initial movement of the large segments 16 which initially have only a slight component of motion in the radial direction (because the arms 60 and 67 are initially aligned very nearly in a radial direction) with the result that their initial swinging movement provides a relatively large component of motion in the circumferential direction.

Yet another feature of construction to be noted, is the relative positioning of the pivot points of the swing arms 60 and 67 in the expanded position of the drum. As shown in FIGURES 2 and 5, the pivot points 68 and 71 of the curved arms 67 are aligned with a slight circumferential offset indicated at "b," while the pivot points 61 and 64 of arms 60 are offset from each other by an amount indicated at "c," which is slightly greater than offset "b." Furthermore, these offsets "b" and "c" are such that the large segments in the expanded position of the drum are positioned beyond "dead center." Accordingly, after the actuating member 25 has been braked, the segments 16 have to swing outwardly to pass the dead center position before they start their radially inward movement, and the leading edges 28 must swing outwardly more than the trailing edges 29 by an amount determined by the difference between offsets "b" and "c." The trailing edges 29 accordingly begin to move radially inwardly slightly before the leading edges 28 and hence begin to move the small segments inwardly out of the way of edges 28 sooner than would otherwise occur without the provision of these offsets.

The offset positions of the pivot points of the swing arms 60 and 67 of the large segments, which cause the arms to take a final position slightly beyond dead center, is also advantageous because the large segments 16 are thereby locked in place against any radial pressure that is exerted on the large segments during the tire building operation. The drum cannot collapse without first the swing arms moving radially outwardly a short distance and, of course, this outward movement cannot be accomplished by the exertion of radial pressure. This feature insures that, once the drum is fully expanded, accidental collapse cannot be produced by the radial pressure of tire building, but can be produced only by the relative rotation of the actuating sleeve 25 with respect to the hub 18.

After the swing arms of the large segments have moved past dead center and have begun their inward movement, the leading edges 28 of the large segments will move toward the trailing edges 31 of the adjacent small segment but the chamfered surfaces of these two edges will enable them to move past each other without colliding and this feature combined with those mentioned above insures an adequate clearance between the large and small segments as the drum collapse proceeds. Since there is no possibility of the trailing edges 29 of the large segments interfering with the leading edges 30 of the small segments, these edges, both 29 and 30, are cut radially so as to present square surfaces and the abutment of these edges functions as an effective stop when the drum is brought out to its expanded condition.

While the collapse of the drum has been described as being accomplished by using the inertia of the rotating drum to move the shell segments inwardly, various other means may be used. For example, the actuating member 25 may be held stationary by brake 26 and the hub and its associated parts may be driven by other means such as the air cylinder indicated at 80 in FIGURE 1 which can be used to impart rotational movement to the shaft by means of the flanged member 81 which is keyed to the shaft 19. In normal operation, the flange member 81 will not be operatively connected with the air cylinder but will be connected to it for operation whenever it is desired to collapse the drum. Alternatively, the drum may be collapsed by holding the hub 18 stationary, as by the brake 22 and driving the operating member 25 by suitable drive means engaging the sleeve 27. The expansion of the drum from its collapsed position may be effected by any of the other members. For example, the collapsed drum may be rotated, in the clockwise position as viewed in FIGURE 4, and with considerable speed so that the parts will require rotational energy and at this moment the actuating member may be braked at which time the large segments 16 will swing outwardly on their swing arms carrying the small segments from their retracted position until the complete cylindrical surface, FIGURE 2, is formed. Expansion of the drum may be effected carrying out in reverse any of the collapsing processes.

The details of construction by which the swing arms 60 and 67 are connected to the actuating member 25 and to the segments 16 and 17 do not form an important part of the invention. In the present example, the actuating member 25 is preferably notched lengthwise, as shown in FIGURE 2, and is also provided with circumferentially extending notches as indicated at 83 and 84 in FIGURE 7, to receive the inner ends of the arms 60 and 67, respectively, and to provide room to enable the arms to complete their required swinging movements, see also FIGURES 5 and 6.

As noted above, in the collapsed condition of the drum, the large segments 16 form a closed surface which in section is in the form of a quadrangle with sides of considerable curvature, see FIGURE 4. This surface is sufficiently continuous to enable the tire to be stripped from the drum without its catching on projecting points or edges. The continuity of surface and its almost cylindrical form, moreover, enables the drum to be used in a manner of building tires which ordinarily cannot be employed with mechanically collapsible drums. Thus with the drum of the present invention, plies can be assembled on the collapsed drum of FIGURE 4 and then stitched together to form a tire body. The drum can then be expanded to expand the center portion of the assembled plies but without expanding the end portion of the plies which project beyond the shoulders of the drum. These projecting ply end portions tend to retain their original diameter, a diameter which necessarily is substantially smaller than the expanded diameter so that these ply ends in effect assume a turned-in or turned-down position enabling tire bead cores to be applied directly over these ply ends. These end portions can then be turned out and around the cores to form the tire beads. When the drum is used in this manner, the conventional ply turndown operation can be eliminated.

Various modifications and changes will no doubt suggest themselves to those skilled in the art without departing from the scope of the invention the essential features of which are summarized in the appended claims.

I claim:

1. A collapsible tire building drum comprising an outer shell of relatively large segments alternating with relatively small segments, a hub, an actuating member rotatable with respect to said hub, radial spokes fixed on said hub, each of said small segments pivotally secured on one of said fixed hub-spokes, each of said large segments pivotally secured on one of said small segments, and arms pivoted on said actuating member and adapted upon rotation of said member to move all of said segments selectively away from the axis of said drum to form a circumferentially continuous surface of all said segments and toward the axis of said drum to form a circumferentially continuous surface of said larger segments.

2. A collapsible tire building drum as in claim 1, wherein each said small segment is additionally linked by one of said arms to said actuating member.

3. A collapsible tire building drum as in claim 1, wherein said arms are adapted to move all of said segments toward the axis of said drum to abut said large segments and form a circumferentially continuous surface.

4. A collapsible tire building drum adapted to present a continuous circumferential surface at each of two diameters, comprising an outer shell of relatively large segments alternating with relatively small segments, a hub, an actuating member rotatable with respect to said hub, radial spokes fixed on said hub, each of said small segments secured for motion about a radially fixed pivot point on one of said fixed hub-spokes, each of said large segments pivotally secured on one of said small segments, and arms pivoted on said actuating member and adapted upon rotation of said member to move all of said segments selectively away from the axis of said drum to form a circumferentially continuous surface of all said segments and toward the axis of said drum to form a circumferentially continuous surface of said large segments.

References Cited in the file of this patent
UNITED STATES PATENTS

| | | |
|---|---|---|
| 1,636,056 | Johnson | July 19, 1927 |
| 1,648,132 | Johnson | Nov. 8, 1927 |
| 1,669,532 | Myers | May 15, 1928 |
| 1,866,390 | Bostwick | July 5, 1932 |
| 1,877,746 | Heston | Sept. 13, 1932 |
| 2,016,884 | Bostwick | Oct. 8, 1935 |
| 2,514,215 | Stevens et al. | July 4, 1950 |
| 2,655,977 | Hodgkins | Oct. 20, 1953 |